(12) United States Patent
Chugh et al.

(10) Patent No.: US 12,175,014 B2
(45) Date of Patent: Dec. 24, 2024

(54) METHODS AND DEVICES FOR GAZE ESTIMATION

(71) Applicants: Soumil Chugh, Markham (CA); Juntao Ye, Markham (CA)

(72) Inventors: Soumil Chugh, Markham (CA); Juntao Ye, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 441 days.

(21) Appl. No.: 17/536,683

(22) Filed: Nov. 29, 2021

(65) Prior Publication Data
US 2023/0168735 A1  Jun. 1, 2023

(51) Int. Cl.
| | |
|---|---|
| *G06K 9/00* | (2022.01) |
| *G06F 3/01* | (2006.01) |
| *G06N 3/045* | (2023.01) |
| *G06N 3/08* | (2023.01) |
| *G06V 10/25* | (2022.01) |
| *G06V 10/80* | (2022.01) |
| *G06V 10/82* | (2022.01) |
| *G06V 40/16* | (2022.01) |
| *G06V 40/18* | (2022.01) |

(52) U.S. Cl.
CPC .............. *G06F 3/013* (2013.01); *G06N 3/045* (2023.01); *G06N 3/08* (2013.01); *G06V 10/25* (2022.01); *G06V 10/80* (2022.01); *G06V 10/82* (2022.01); *G06V 40/171* (2022.01); *G06V 40/193* (2022.01)

(58) Field of Classification Search
CPC ......... G06F 3/013; G06F 3/012; G06N 3/045; G06N 3/08; G06N 3/0464; G06N 3/084; G06N 3/09; G06V 10/25; G06V 10/80; G06V 10/82; G06V 40/171; G06V 40/193; G06V 10/806; G06V 40/168; G06V 10/454
See application file for complete search history.

(56) References Cited

U.S. PATENT DOCUMENTS

| | | | |
|---|---|---|---|
| 2004/0146187 A1* | 7/2004 | Jeng | G06V 40/171 382/117 |
| 2018/0081434 A1* | 3/2018 | Siddiqui | G06V 40/20 |
| 2018/0137335 A1* | 5/2018 | Kim | G06N 3/08 |

(Continued)

OTHER PUBLICATIONS

Cazzato, D., Dominio, F., Manduchi, R. and Castro, S.M., 2018. Real-time gaze estimation via pupil center tracking. Paladyn, Journal of Behavioral Robotics, 9(1), pp. 6-18.

(Continued)

*Primary Examiner* — Duy M Dang

(57) ABSTRACT

Methods and systems for estimating a gaze direction of an individual using a trained neural network. Inputs to the neural network include a face image and an image of a visually significant eye in the face image. Feature representations are extracted for the face image and significant eye image and feature fusion is performed on the feature representations to generate a fused feature representation. The fused feature representation is input into a trained gaze estimator to output a gaze vector including gaze angles, the gaze vector representing a gaze direction. The disclosed network may enable gaze estimation performance on user devices typically having limited hardware and computational resources such as mobile devices.

20 Claims, 8 Drawing Sheets

(56) References Cited

U.S. PATENT DOCUMENTS

| | | | |
|---|---|---|---|
| 2018/0300589 A1 | 10/2018 | Levinshtein et al. | |
| 2019/0056781 A1* | 2/2019 | Liu | G06F 3/013 |
| 2019/0259174 A1* | 8/2019 | De Villers-Sidani | G06T 7/73 |
| 2021/0012525 A1* | 1/2021 | Barton | G06V 40/171 |

OTHER PUBLICATIONS

Jianfeng, L. and Shigang, L., 2014. Eye-model-based gaze estimation by RGB-D camera. In Proceedings of the IEEE Conference on Computer Vision and Pattern Recognition Workshops (pp. 592-596).

Krafka, K., Khosla, A., Kellnhofer, P., Kannan, H., Bhandarkar, S., Matusik, W. and Torralba, A., 2016. Eye tracking for everyone. In Proceedings of the IEEE conference on computer vision and pattern recognition (pp. 2176-2184).

Zhang, X., Sugano, Y., Fritz, M. and Bulling, A., 2017. It's written all over your face: Full-face appearance-based gaze estimation. In Proceedings of the IEEE Conference on Computer Vision and Pattern Recognition Workshops (pp. 51-60).

Bao, Y., Cheng, Y., Liu, Y. and Lu, F., 2021, January. Adaptive feature fusion network for gaze tracking in mobile tablets. In 2020 25th International Conference on Pattern Recognition (ICPR) (pp. 9936-9943). IEEE.

Zhang, X., Sugano, Y., Fritz, M. and Bulling, A., 2017. Mpiigaze: Real-world dataset and deep appearance-based gaze estimation. IEEE transactions on pattern analysis and machine intelligence, 41(1), pp. 162-175.

Zhang, X., Sugano, Y., Bulling, A. and Hilliges, O., 2020. Learning-based region selection for end-to-end gaze estimation. In British Machine Vision Conference (BMVC 2020).

Cheng, Y., Zhang, X., Lu, F. and Sato, Y., 2020. Gaze estimation by exploring two-eye asymmetry. IEEE Transactions on Image Processing, 29, pp. 5259-5272.

Sandler, M., Howard, A., Zhu, M., Zhmoginov, A. and Chen, L.C., 2018. Mobilenetv2: Inverted residuals and linear bottlenecks. In Proceedings of the IEEE conference on computer vision and pattern recognition (pp. 4510-4520).

Ronneberger, O., Fischer, p. and Brox, T., 2015, October. U-net: Convolutional networks for biomedical image segmentation. In International Conference on Medical image computing and computer-assisted intervention (pp. 234-241). Springer, Cham.

\* cited by examiner

METHODS AND DEVICES FOR GAZE ESTIMATION

FIELD

The present disclosure relates to the field of computer vision, in particular methods and devices for estimating gaze direction.

BACKGROUND

Gaze tracking is a useful indicator of human visual attention and has wide ranging applications in areas such as human-computer interaction, automotive safety, medical diagnoses, and accessibility interfaces, among others. An eye tracking or gaze estimation device tracks eye movements and estimates the point of gaze either on a display screen or in the surrounding environment. To capitalize on the benefits of gaze tracking, monitoring systems should preferably be easily accessible, operate with a high degree of accuracy and be minimally affected by image noise.

A common approach for gaze estimation is video-based eye tracking. In many cases, a camera is used to capture eye images. Cameras may be infrared (IR) cameras (which capture IR data) or RGB cameras (which capture visible spectrum data). In many research settings, an IR camera is used in conjunction with light-emitting diodes for eye illumination, due to the high level of accuracy that can be achieved for gaze tracking. Conventionally, gaze-tracking using IR cameras have been found to exhibit superior performance over gaze-tracking using RGB cameras; however, IR-based eye-tracking systems require specialized hardware that may be expensive and which are not standard in commercial end user devices such as mobile phones or tablets. Experimental conditions using IR cameras may also not reflect real-world environments, in which factors such as poor illumination conditions and extreme head movements may hinder gaze tracking accuracy.

To extend the accessibility of eye-tracking tools to real-world environments and mobile devices, it would be useful to provide a method and system for accurately estimating gaze direction using a RGB camera.

SUMMARY

In various examples, the present disclosure describes methods and systems for estimating an individual's gaze direction using a neural network, and using input hardware and computational resources that are typically available on end user devices (e.g., existing mobile devices). Specifically, inputs are obtained from an RGB camera, representing a face image and an image of an individual's significant eye. Feature representations are extracted for the face image and significant eye image and then are fused together to generate a fused feature representation. The fused feature representation is input into a trained gaze estimator to output an estimated gaze vector representing a gaze direction. The disclosed network may help to overcome challenges associated with gaze estimation performance using hardware and computational resources typically found on end user devices, including devices having limited hardware and computational resources such as mobile devices.

In various examples, the present disclosure provides the technical effect that a gaze direction, in the form of a gaze vector that includes gaze angles is estimated. Inputs obtained from an RGB camera in the form of face images are inputted into a neural network to estimate the point of gaze either on a screen or in a surrounding environment.

In some examples, the present disclosure provides the technical advantage that a gaze direction is estimated, using inputs obtained from typically available hardware on current end user devices such as an RGB camera.

Examples of the present disclosure may enable improved gaze estimation performance in real-life environments (e.g. using a mobile device, under poor illumination conditions and/or with varying head movements) without requiring expensive computing equipment that is typically limited to use in research settings.

In some aspects, the present disclosure describes a method for estimating a gaze vector representing a gaze direction. The method comprises a number of steps. The method comprises: obtaining a face image, extracting one or more feature maps from the face image; obtaining a significant eye image patch containing a significant eye extracted from the face image; extracting one or more significant eye image feature maps from the significant eye image patch; performing feature fusion on the one or more face feature maps and the one or more significant eye image feature maps to generate fused features; and outputting an estimated gaze vector from the fused features.

In some examples, obtaining the significant eye image patch comprises: extracting an eye image patch from the face image; identifying one or more iris regions in the eye image patch; comparing a size of the one or more iris regions to identify a largest iris region of the one or more iris regions; selecting a significant eye for the eye image patch, the significant eye for the eye image patch corresponding to the largest iris region of the one or more iris regions; and extracting a significant eye image patch containing the significant eye from the face image.

In some examples, identifying one or more iris regions in the eye image patch comprises: generating an iris region probability map from the eye image patch, the iris region probability map representing a probability of each of a plurality of pixels in the eye image patch being associated with the one or more iris regions; applying a threshold to the iris region probability map to generate an iris region mask representing one or more estimated iris regions; and fitting one or more ellipses to the iris region mask, the one or more ellipses form respective one or more boundaries of the respective one or more iris regions.

In some examples, selecting the significant eye for the eye image patch comprises: comparing a size of the fitted one or more ellipses to the iris region mask to identify a largest ellipse of the one or more ellipses, the largest ellipse of the one or more ellipses represents the significant eye; and generating a boundary of the significant eye in the eye image patch.

In some examples, extracting the significant eye image patch from the face image comprises: mapping a location of the boundary of the significant eye in the eye image patch to a corresponding location in the face image to generate a boundary of the significant eye in the face image; and extracting the significant eye image patch from the face image based on the boundary of the significant eye in the face image.

In some examples, performing feature fusion on the one or more face feature maps and the one or more significant eye image feature maps comprises: multiplying the one or more face feature maps and the one or more significant eye image feature maps using element wise multiplication.

In some examples, outputting the gaze vector comprises: extracting depth-related information across one or more channels from the fused features.

In the preceding example aspect of the method, wherein extracting depth-related information from the fused features uses depth-wise convolution layers.

In any of the preceding example aspects of the method, wherein the face image may be an RGB image without depth data.

In any of the preceding example aspects of the method, wherein the method may be performed on a mobile device.

In some examples, the present disclosure describes an electronic device for estimating a gaze vector representing a gaze direction. The device includes a processing unit configured to execute instructions to cause the device to: obtain a face image; extract one or more face feature maps from the face image; obtain a significant eye image patch containing a significant eye extracted from the face image; extract one or more significant eye image feature maps from the significant eye image patch; perform feature fusion on the one or more face feature maps and the one or more significant eye image feature maps to generate fused features; and output an estimated gaze vector from the fused features.

In some examples, in obtaining the significant eye image patch, the processing unit may be further configured to execute the instructions to cause the device to: extract an eye image patch from the face image; identify one or more iris regions in the eye image patch; compare a size of the one or more iris regions to identify a largest iris region of the one or more iris regions; select a significant eye for the eye image patch, the significant eye for the eye image patch corresponding to the largest of the one or more iris regions; and extract a significant eye image patch containing the significant eye from the face image.

In some examples, in identifying one or more iris regions in the eye image patch, the processing unit may be further configured to execute the instructions to cause the device to: generate an iris region probability map from the eye image patch, the iris region probability map representing a probability of each of a plurality of pixels in the eye image patch being associated with the one or more iris regions; apply a threshold to the iris region probability map to generate an iris region mask representing one or more estimated iris regions; and fit one or more ellipses to the iris region mask, the one or more ellipses form respective one or more boundaries of the respective one or more iris regions.

In some examples, in selecting the significant eye for the eye image patch, the processing unit may be further configured to execute the instructions to cause the device to: compare a size of the one or more fitted ellipses to the iris region mask to identify a largest ellipse of the one or more ellipses, the largest ellipse of the one or more ellipses represents the significant eye; and generate a boundary of the significant eye in the eye image patch.

In some examples, in extracting the significant eye image patch from the face image, the processing unit may be further configured to execute the instructions to cause the device to: map a location of the boundary of the significant eye in the eye image patch to a corresponding location in the face image to generate a boundary of the significant eye in the face image; and extract the significant eye image patch from the face image based on the boundary of the significant eye in the face image.

In some examples, in performing feature fusion on the one or more face feature maps and the one or more significant eye image feature maps, the processing unit may be further configured to execute the instructions to cause the device to: multiply the one or more face feature maps and the one or more significant eye image feature maps using element wise multiplication.

In some examples, the processing unit may be further configured to execute the instructions to cause the device to extract depth-related information across one or more channels from the fused features.

In some example aspects of the device, wherein the face image is an RGB image without depth data.

In some example aspects of the device, wherein the device is a mobile device.

In some examples, the present disclosure describes a non-transitory computer-readable medium having machine-executable instructions stored thereon which, when executed by a processor of a device, cause the device to: obtain a face image; extract one or more face feature maps from the face image; obtain a significant eye image patch containing a significant eye extracted from the face image; extract one or more significant eye image feature maps from the significant eye image patch; perform feature fusion on the one or more face feature maps and the one or more significant eye image feature maps to generate fused features; and output an estimated gaze vector from the fused features.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
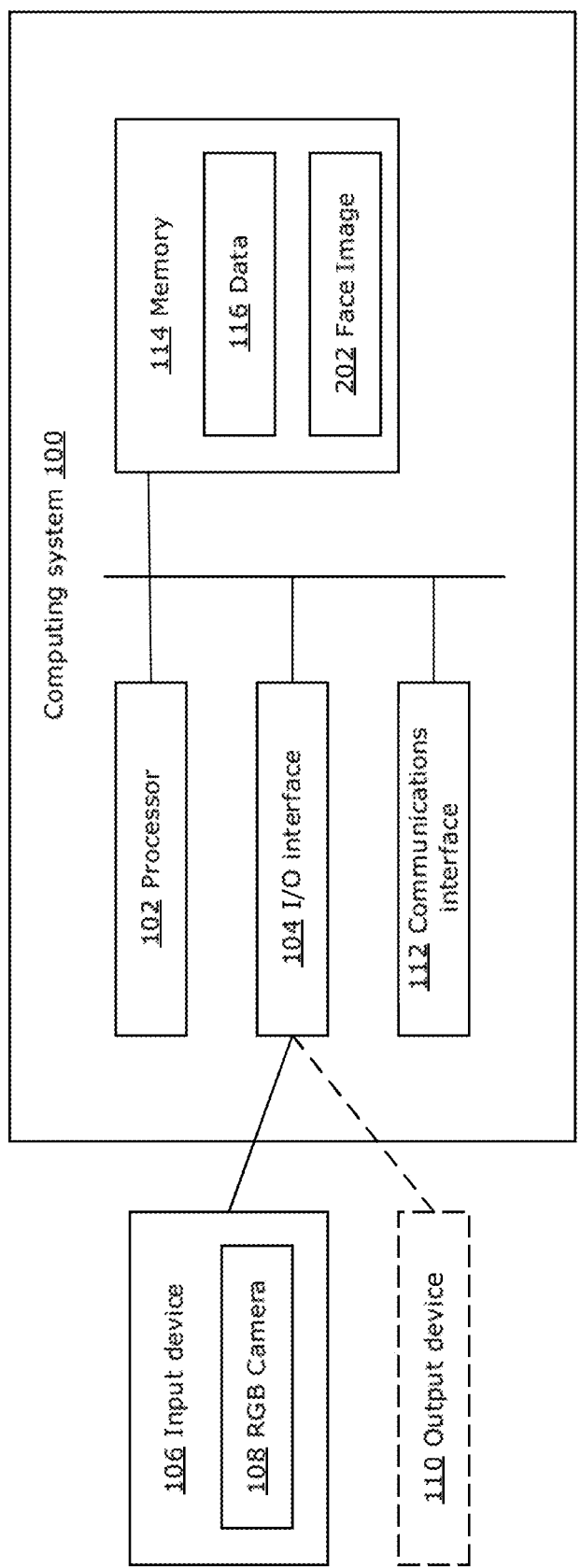
FIG. 1 is a block diagram illustrating an example hardware structure of a computing system that may be used for implementing methods to estimate a gaze vector representing a gaze direction, in accordance with examples of the present disclosure.

The following describes example technical solutions of this disclosure with reference to accompanying drawings.

In various examples, the present disclosure describes methods and systems for estimating a gaze vector, representing a gaze direction, using a neural network. The disclosed neural network is designed to perform a primary task of estimating gaze direction, in the form of a gaze vector including gaze angles, with auxiliary tasks such as feature extraction and feature fusion being used for implementing the gaze estimator network. A sub-network is used to extract images representing an individual's significant eye from face images obtained using an RGB camera. Inputs to the gaze estimation system include face images and significant eye images. Feature representations are extracted for the face image and significant eye image and then are fused together to generate a fused feature representation. The fused feature representation is inputted into a trained gaze estimator to output an estimated gaze direction.

To assist in understanding the present disclosure, some existing techniques for gaze tracking are now discussed.

Existing RGB-based eye-tracking tools can be categorized by the type of algorithm used to estimate the point of gaze or gaze direction. For example, feature-based methods use the spatial location of features extracted from images of the face (e.g. location of pupil/iris or eye corners). Model-based methods use a 3D model of the eye, where a visual axis of the eye is determined to be the vector that connects the nodal point of the eye and the fovea and the point of gaze is the intersection of the eye's visual axis and the scene of interest. Appearance-based methods use the appearance of the face or eye in the image to learn a direct mapping between the input image and the gaze direction or point of gaze.

Current RGB-based eye-tracking techniques suffer from limitations which can impact the accuracy of estimated gaze direction and performance in real-time. For example, estimating eye features from a face image is a challenging process, particularly in sub-optimal lighting conditions and at extreme head angles, therefore feature-based methods may be accurate in ideal environments (e.g., brightly illuminated environments, with the face looking straight forward) only. In the case of model-based methods, to create an accurate 3D model of the eye, the images captured by RGB cameras may not provide sufficient depth information, therefore 3D model methods may be limited to use with cost-prohibitive, specialized cameras not typically available in existing end user devices (e.g., existing mobile devices). Finally, appearance-based systems can also suffer from challenges associated with poor illumination, changes in appearance and eye occlusions.

Some attempts have been made to apply machine learning-based techniques to appearance-based methods for gaze tracking. For example, some approaches have leveraged neural network architectures to learn the mapping between face or eye images and gaze direction, with convolutional neural networks (CNN) demonstrating better performance over conventional neural networks. A benchmark face image dataset (MPIIGaze) was assembled and documented in Zhang, Xucong, et al. "It's written all over your face: Full-face appearance-based gaze estimation," *Proceedings of the IEEE Conference on Computer Vision and Pattern Recognition Workshops,* 2017, which is incorporated herein by reference. Performance of CNNs trained and evaluated using this benchmark dataset have reported an accuracy in the range of 4.5°-6° when face and eye images are used as inputs to the gaze tracking network, however these CNNs can vary in complexity and may not perform optimally on mobile devices (e.g., due to limited processing power of mobile devices).

Further, for accurate prediction of gaze direction, a desired solution must effectively mitigate challenges introduced by changes in the user's environment, such as poor illumination and/or extreme head poses (such as head poses in which the user's face may be turned away from the camera). In examples where the end user device is a mobile device, there may be further challenges due to additional motion and/or more extreme camera input angles compared to a stationary camera (e.g. a laptop camera when the laptop is situated on a desk). To account for head pose, some existing gaze-tracking methods combine inputs from eye regions with face images in probabilistic or equally weighted approaches. Unfortunately, the performance of these gaze-tracking networks have been found to be highly variable, with reported variations as large as 15° under extreme head pose and illumination conditions. While improvements in gaze direction accuracy may be possible using more complex CNNs, the ability of these networks to run reliably on an end user device (particularly devices having limited power and/or computing resources, such as mobile devices) under varying environmental conditions remains a challenge.

The present disclosure describes examples that may help to address some or all of the above drawbacks of existing technologies.

To assist in understanding the present disclosure, the following describes some concepts relevant to neural networks, and particularly CNNs for the purpose of image processing, along with some relevant terminology that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, . . . n, n is a natural number greater than 1, $W_s$ is a weight of $x_s$, b is an offset (i.e. bias) of the neuron and f is an activation function of the neuron and used to introduce a nonlinear feature to the neural network, to convert an input of the neuron to an output denoted as h.

A neural network may be constructed in layers, including an input layer that accepts inputs, an output layer that generates a prediction as output, and in the case of deep neural networks (DNN), a plurality of hidden layers which are situated between the input layer and output layer. The output of the activation function in one layer may be used as an input to a neuron of a subsequent layer in the neural network. In other words, an output from one neuron may be an input to another neuron. Different activation functions may be used for different purposes in a neural network, with hidden layers commonly using different activation functions than output layers. For example, a rectified linear unit (ReLU) is a commonly used activation function for hidden layers due to its computational efficiency during training. ReLU will directly pass an input to an output if the input is positive, otherwise the output is zero. In another example, a sigmoid function or a Tan h function may be activation functions commonly used at output layers, where the range of a sigmoid function may be [0,1] and the range of a Tan h function may be [−1,1].

A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may follow a linear relational expression: $\vec{y}=\alpha(W\vec{x}+\vec{b})$, where $\vec{x}$ is an input vector, $\vec{y}$ is an output vector, $\vec{b}$ is an offset vector, W is a weight (also referred to as a coefficient), and $\alpha(.)$ is an activation function. At each layer, the operation is performed on an input vector $\vec{x}$, to obtain an output vector $\vec{y}$. Because there is a large quantity of layers in the DNN, there is also a large quantity of weights W and offset vectors $\vec{b}$. The weights may be referred to as parameters of the neural network, the optimal values of which may be learned by training the neural network.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

Before a DNN can be trained, the initial weights need to be set. For example, an initialization function such as random or Gaussian distributions may define initial weights. For example, a Gaussian distribution with zero mean and variance that is proportional to the inverse of the number of weights of each layer may be used.

In the process of training a DNN, two approaches are commonly used: supervised learning and unsupervised learning. In unsupervised learning, the neural network is not provided with any information on desired outputs, and the neural network is trained to arrive at a set of learned weights on its own. In supervised learning, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the weight vector converges). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

A CNN is a neural network that is designed to find the spatial relationship in data. CNNs are commonly used in applications related to computer vision for the purposes of classification, regression, segmentation and/or object detection. A CNN is a DNN with a convolutional structure. The CNN includes a feature extractor consisting of a convolutional layer and a sub-sampling layer. The convolutional layer consists of kernels or filters that are convolved with a two-dimensional (2D) input image to generate feature maps or feature representations using a trainable filter.

The convolutional layer is a layer of neurons at which convolution processing is performed on an input in the CNN. In a convolutional layer, one neuron may be connected only to a subset of neurons (i.e., not all neurons) in neighboring layers. That is, a convolutional layer generally is not a fully connected layer. One convolutional layer usually generates several feature maps using a convolutional kernel. Typically, a convolutional kernel is a 2D matrix of weights. It should be understood that the convolutional kernel may be unrelated to a manner and position of image information extraction. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

Convolution operations used in convolutional layers may take many forms, including standard convolution, depth-wise convolution and transposed convolution. Standard Convolution is parameterized by kernel size, the number of kernels, padding and stride. The stride parameter controls the degree of movement of a kernel over an input image. Stride is represented in terms of the number of pixels the kernel will shift at each convolution step. When a stride is greater than 1, the output feature map reduces in size. The output dimensions resulting from applying standard convolution to an input image is computed using the following equation:

$$\text{Output} = \frac{W - F + 2*P}{N}$$

where W is the input image size, F denotes the filter size, P denotes padding, and N denotes the value of stride.

Depth-wise Convolution is a type of convolution where an input filter is applied to each input channel separately. In contrast to standard convolution, in which a filter is as deep as the input image and information from all channels are mixed to generate the output, depth-wise convolution performs a convolution operation separately for every input channel of an input image, and the convolved outputs are stacked together. Depth-Wise convolution aims to learn the features from the input image for each channel independently.

Transposed Convolution is used to increase the resolution of the input image, or upsample the input, to produce an output feature map with dimensions that are larger than the input. Transposed convolution is also parameterized by the number of kernels, kernel size, padding and stride, however the method uses a modified input feature map. Transposed convolution is performed as follows. For every pixel in the input image, a kernel in a transposed convolution strides over the output feature map. The value of stride is usually higher than 1. The kernel values get multiplied with the corresponding input pixel. The resulting weighted kernel values get copied to the overlapping region in the output feature map.

In some examples, a CNN network may be conceptually divided into two parts, the first being a downsampling subnetwork and the second being an upsampling subnetwork. In generating feature representations of input images, common CNN architectures, such as those with standard or depth-wise convolutional processes reduce the dimensionality of the output compared to the input. In some cases, it may be desirable to upsample the output to ensure that the spatial dimensions match the input image. This kind of network is commonly known as an encoder-decoder network. Upsampling may be achieved using a variety of techniques, for example using transposed convolution.

In addition to convolutional layers, a typical CNN architecture may also include pooling layers and normalization layers. Pooling layers reduce the spatial size of the feature maps (i.e. feature representations), thereby reducing the number of parameters and required computation of the network. Pooling layers are generally applied after a convolutional layer and operate on each feature map (i.e. feature representation) separately. These layers may reduce the size by averaging neighboring elements (in the case of an Average Pooling Layer) or by selecting the maximum value within a local window (in the case of a Max Pooling Layer). Pooling increases the receptive field of a neuron, increasing the network's performance for some tasks. Layer normalization acts to normalize the distributions of hidden layers in a CNN network. Layer normalization has a regularization effect, which can reduce overfitting and improves generalization.

In the present disclosure, a "feature extractor" is defined as a component of a CNN model that builds a set of derived values (i.e. features) from input data, such that the derived values contain relevant information from the source, often with reduced dimensionality. The feature extractor transforms input data into a set of features with reduced dimensionality (also referred to as a feature representation) and a desired task (for example, classification) may then be performed on this representation.

In the present disclosure, a "feature map" or "feature representation" is defined as the result of applying a filter or a feature extractor to an input image. For example, an output of a convolution layer may be a feature map. A feature map may be considered to be a type of feature representation where the features are structured in a matrix format (hence "mapping" onto an image).

In the present disclosure, "feature fusion" is defined as the consolidation of feature maps or feature representations from different sources into a single feature representation. By fusing features into a single representation, correlated features may be enhanced for improved recognition accuracy.

In the present disclosure, a "significant eye" is defined as a visible eye region, from among one or more visible eye regions in a face image, that contains optimal visual information compared to other visible eye region(s) in the face image. Generally, depending on factors such as head pose, camera angle or illumination level, there is typically one eye (referred to herein as the significant eye) that is more dominant, more visible, is measured with a larger size or that occupies a larger area of the image, compared to a smaller or obscured second visible eye region in the same face image.

FIG. 1 is a block diagram illustrating an example hardware structure of a computing system 100 that is suitable for implementing embodiments described herein. Examples of the present disclosure may be implemented in other computing systems, which may include components different from those discussed below. The computing system 100 may be used to execute instructions for estimating a gaze vector representing a gaze direction, using any of the examples described herein. The computing system 100 may also be used to train the gaze estimation network, or the gaze estimation network may be trained by another computing system.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single end user device, single server, etc.), and may include mobile communications devices (smartphones), laptop computers, tablets, desktop computers, vehicle driver assistance systems, smart appliances, wearable devices, assistive technology devices, medical diagnostic devices, virtual reality devices, augmented reality devices, Internet of Things (IoT) devices, interactive kiosks, advertising and interactive signage, and educational tools, among others.

The computing system 100 includes at least one processor 102, such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an input/output (I/O) interface 104, which may enable interfacing with an input device 106 and/or an optional output device 108. In the example shown, the input device 106 (e.g., a keyboard, a mouse, a microphone, a touchscreen, and/or a keypad) may also include a RGB camera 108. In the example shown, the optional output device 110 (e.g., a display, a speaker and/or a printer) are shown as optional and external to the computing system 100. In other example embodiments, there may not be any input device 106 and output device 108, in which case the I/O interface 104 may not be needed.

The computing system 100 may include an optional communications interface 112 for wired or wireless communication with other computing systems (e.g., other computing systems in a network). The communications interface 112 may include wired links (e.g., Ethernet cable) and/or wireless links (e.g., one or more antennas) for intra-network and/or inter-network communications.

The computing system 100 may include one or more memories 114 (collectively referred to as "memory 114"), which may include a volatile or non-volatile memory (e.g., a flash memory, a random access memory (RAM), and/or a read-only memory (ROM)). The non-transitory memory 114 may store instructions for execution by the processor 102, such as to carry out examples described in the present disclosure. For example, the memory 114 may store instructions for implementing any of the networks and methods disclosed herein. The memory 114 may include other software instructions, such as for implementing an operating system (OS) and other applications/functions.

The memory 114 may also store other data 116, information, rules, policies, and machine-executable instructions described herein, including face images 202 captured by the RGB camera 108.

In some examples, the computing system 100 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 114 to implement data storage, retrieval, and caching functions of the computing system 100. The components of the computing system 100 may communicate with each other via a bus, for example.

Figure 2A:
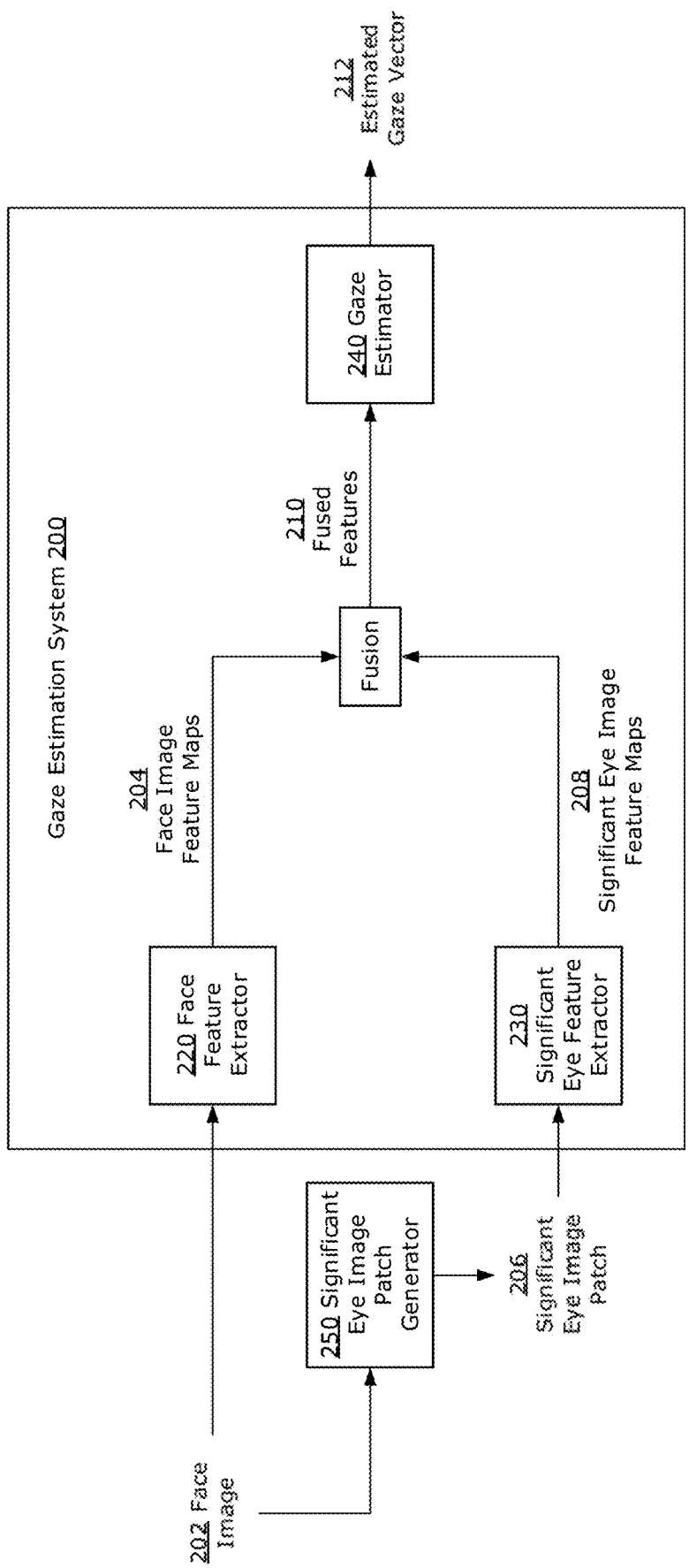
FIG. 2A is a block diagram illustrating an example architecture of a gaze estimation system that may be used to implement methods to estimate a gaze vector representing a gaze direction, in accordance with examples of the present disclosure.

FIG. 2A is a block diagram illustrating an example architecture of the gaze estimation system 200 that may be used to implement methods to estimate a gaze vector 212 representing a gaze direction, in accordance with examples of the present disclosure.

In some examples, the gaze estimation system accepts inputs of a face image 202 and a significant eye image patch 206 and outputs an estimated gaze vector 212 including gaze angles, where the gaze vector represents a gaze direction. The face image 202 may be captured by an RGB camera 108 on the computing system 100 or may be a digital image taken by another RGB camera on another electronic device and communicated to the computing system 100 (e.g., in the case where the computing system 100 provides a gaze estimation service to other devices). A face image 202 may be an RGB image represented as a 2D matrix encoding individual pixels of the input image in multiple channels (e.g., red-green-blue (RGB) channels). For example, the face image 202 may be an image with dimensions 224×224×3 encompassing an individual's face including features such as the eyes, nose, mouth, and chin. A significant eye image patch 206 may be extracted from the face image using a significant eye image patch generator 250 as described in the discussion of FIG. 4A below. The significant eye image patch 206 may be an RGB image with dimensions 56×56×3 encompassing an individual's significant eye. FIG. 2A illustrates the significant eye image patch generator 250 as being external to the gaze estimation system 200. In other examples, the significant eye image patch generator 250 may be part of the gaze estimation system 200 (and only the face image 202 may be provided as input to the gaze estimation system 200).

The face image 202 may be an input to the face feature extractor 220 which outputs 2D face image feature maps 204 (i.e. feature representations). The face feature extractor 220 may be a convolutional neural network such as the Mobile-Net-v2 network presented in Sandler, Mark, et al. "Mobilenetv2: Inverted residuals and linear bottlenecks," *Proceedings of the IEEE conference on computer vision and pattern recognition,* 2018, which is incorporated herein by reference. The face feature extractor 220 may be a convolutional neural network with multiple computational layers, including convolution, pooling and batch normalization layers. In some examples, the face feature extractor 220 may encompass 9 blocks from the MobileNet-v2 network architecture. Due to the presence of pooling layers in the face feature extractor 220, the output face feature maps 204 (i.e. feature representations) may be smaller than the input face image 202, for example having dimensions of 14×14×8.

The significant eye image patch 206 may be an input to the significant eye feature extractor 230 which outputs 2D significant eye image feature maps 208 (i.e. feature representations). The significant eye feature extractor 230 may be a CNN including multiple depth-wise convolution and pooling layers. As an example, the significant eye feature extractor 230 may include two depth-wise convolutional layers and two max pooling layers, however other network architectures may also be used. Depth-wise convolution aims to learn the features from the input image independent of the channels. A max pooling layer may be useful over an average pooling layer in distinguishing features of the eye such as the boundary between the iris and the sclera, or eye corners, among others by selecting the maximum value within a local window. Due to the presence of pooling layers in the significant eye feature extractor 230, the output significant eye image feature maps 208 (i.e. feature representations) may be smaller than the input significant eye image patch 206, for example having dimensions of 14×14×8.

In some examples the features generated from the face feature extractor 220 and significant eye feature extractor 230 undergo feature fusion to generate fused features 210. Feature fusion is a method to integrate the features of different data to enhance the features distinguished from feature extractors. In some examples, feature fusion of the face image feature maps 204 (i.e. feature representations) and significant eye image feature maps 208 (i.e. feature representations) may include element-wise multiplication of each pixel in each face image feature map 204 with the corresponding pixel in each significant eye image feature map 208 to generate fused features 210. As an example, the fused features 210 may be a multi-dimensional feature representation, for example a representation that exhibits dimensions of 14×14×8.

The fused features 210 may then be an input to the gaze estimator 240. The architecture of the gaze estimator 240 is described below with reference to the example of FIG. 2B. The gaze estimator 240 may be a convolutional neural network. It should be understood that the architecture of the gaze estimator 240 may be different from the example discussed herein (e.g., with fewer or greater numbers of neural network layers). In the following discussion, neural network layers (or blocks) of the gaze estimator 240 will be referred to as layers for simplicity.

Figure 2B:
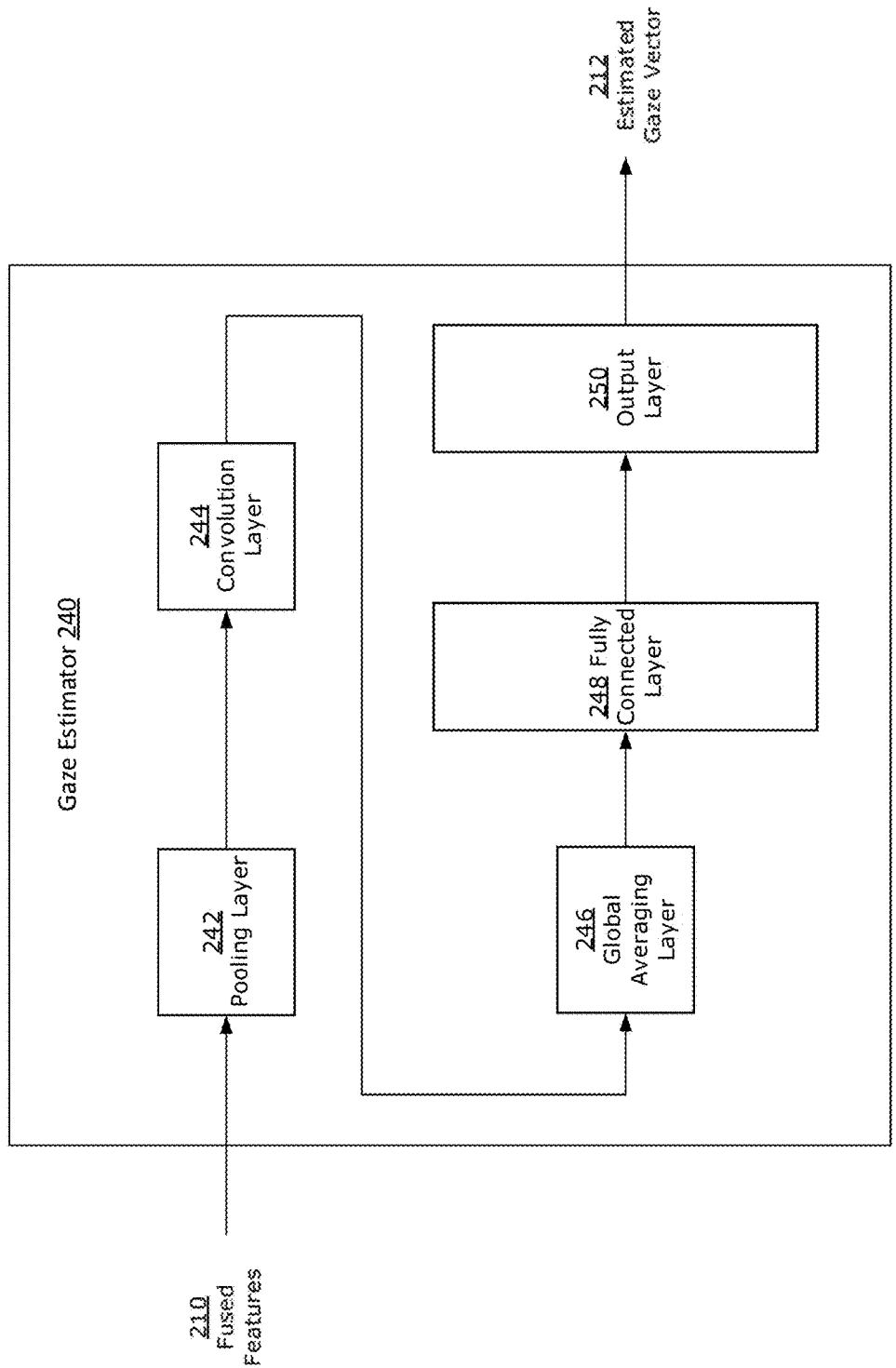
FIG. 2B is a block diagram illustrating an example architecture of a gaze estimator, that may be used to estimate a gaze vector representing a gaze direction, in accordance with examples of the present disclosure.

FIG. 2B is a block diagram illustrating an example architecture of a gaze estimator 240, that may be used to estimate a gaze vector 212 representing a gaze direction, in accordance with examples of the present disclosure. In some examples, the architecture of the gaze estimator 240 may include a pooling layer 242, a convolution layer 244, a global averaging layer 246, a fully connected layer 248 and an output layer 250. The pooling layer 242 may be a 3D average pooling layer in which the pixels are averaged within a local window, reducing the dimensions of the features, in one example to 7×7×4. The convolution layer 244 may be a convolution layer in which kernels are convolved with the output from the pooling layer 242 to generate feature maps (i.e. feature representations), and by example the dimensions of the features may increase to 7×7×8. The global averaging layer 246 has the effect of converting the feature maps (i.e. feature representations) to a 1D vector, for example converting dimensions of the features to 1×1×8. The fully connected layer 248 further reduces the dimensions, for example to 1×1×2, such that the output layer 250 can output an estimated gaze vector 212 containing two angles representing the gaze direction, the angles being a yaw and a pitch.

Figure 3:
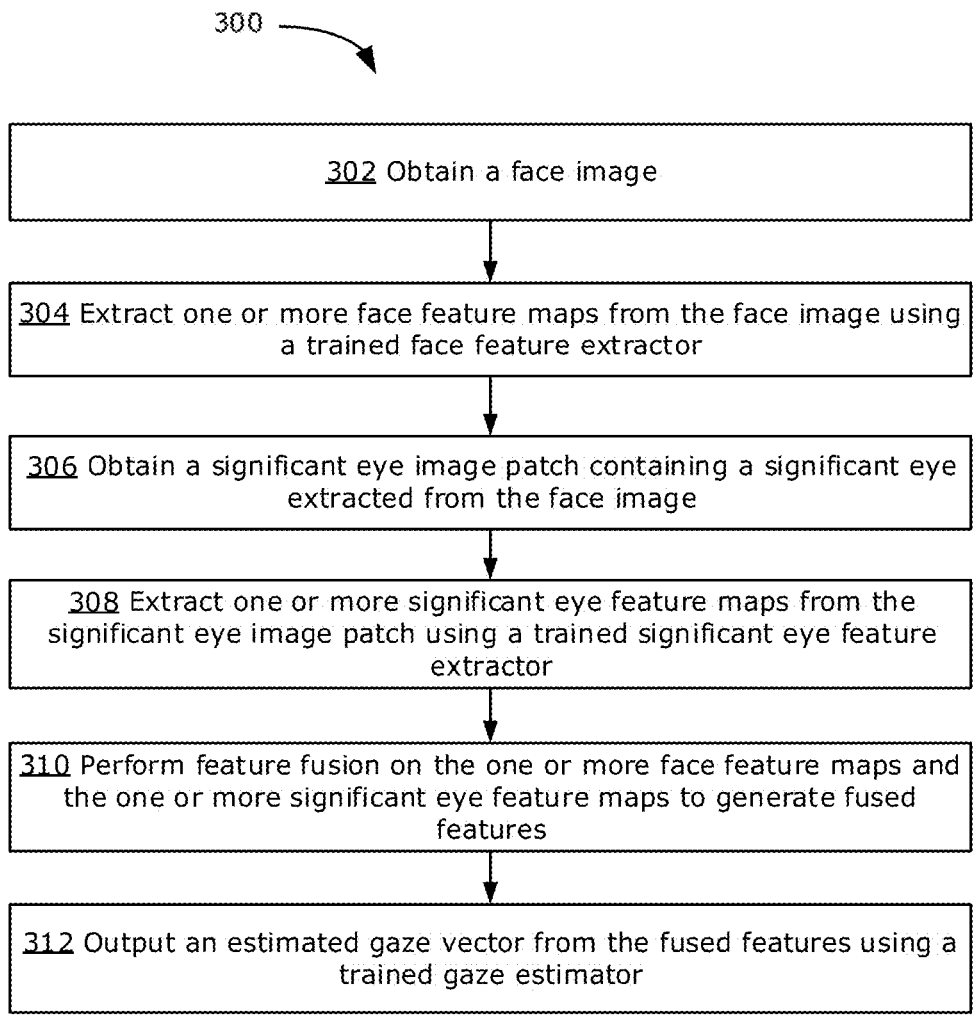
FIG. 3 is a flowchart illustrating an example method for estimating a gaze vector representing a gaze direction, in accordance with examples of the present disclosure.

FIG. 3 is a flowchart illustrating an example method 300 for estimating a gaze vector 212, representing a gaze direction, in accordance with examples of the present disclosure. The method 300 may be performed by the computing system 100. For example, the processor 102 may execute computer readable instructions (which may be stored in the memory 112) to cause the computing system 100 to perform the method 300. The method 300 may be performed using a single physical machine (e.g., a workstation or server), a plurality of physical machines working together (e.g., a server cluster), or cloud-based resources (e.g., using virtual resources on a cloud computing platform).

Method 300 begins with step 302 in which a face image 202 is obtained. The face image 202 may be captured by an RGB camera 108 on the computing system 100 or may be a digital image taken by another RGB camera on another electronic device and communicated to the computing system 100.

At step 304, one or more face feature maps 206 (i.e. feature representations) are extracted from the face image using a trained face feature extractor 220. The face feature extractor 220 may be a convolutional neural network such as the MobileNet-v2 network that has been trained to extract the location of facial features such as the eyes, nose, mouth, and chin, among others.

At step 306, a significant eye image patch 206 containing a significant eye is obtained from the face image 202. To further explain step 306, FIG. 4A, FIG. 4B and FIG. 4C are now described.

Figure 4A:
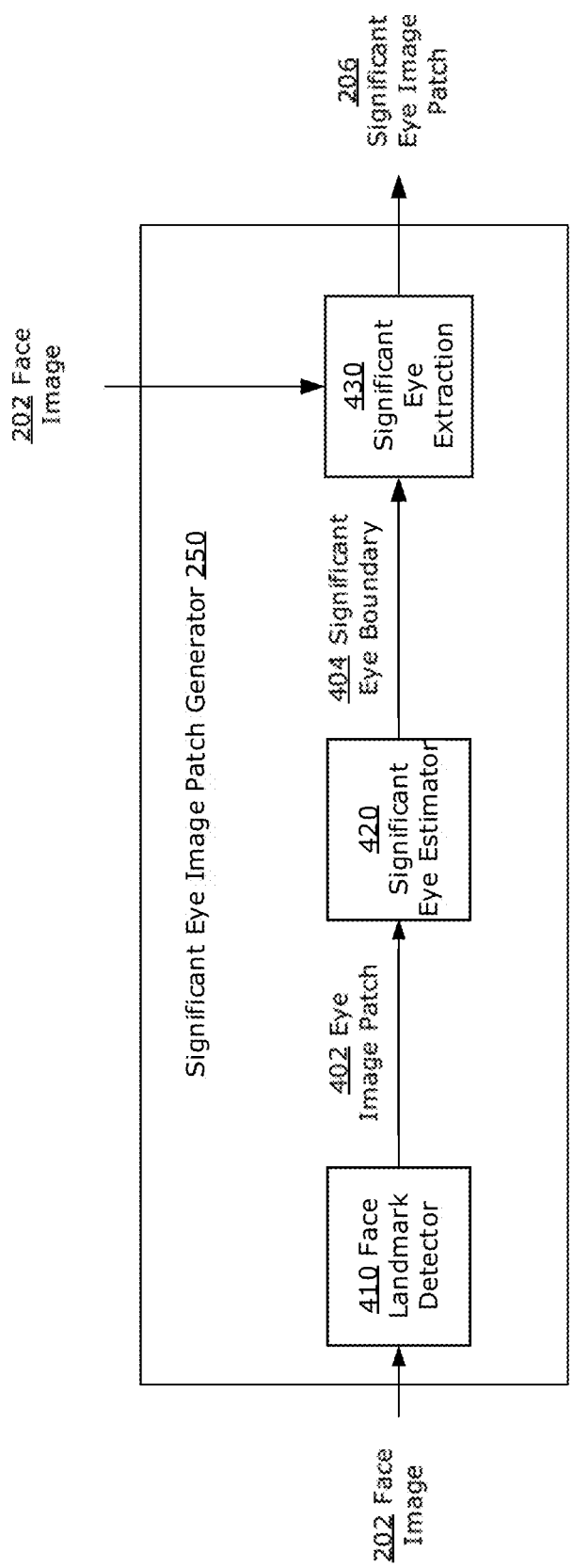
FIG. 4A is a is a block diagram illustrating example functional elements involved in extracting a significant eye image patch from a face image, in accordance with examples of the present disclosure.
Figure 4B:
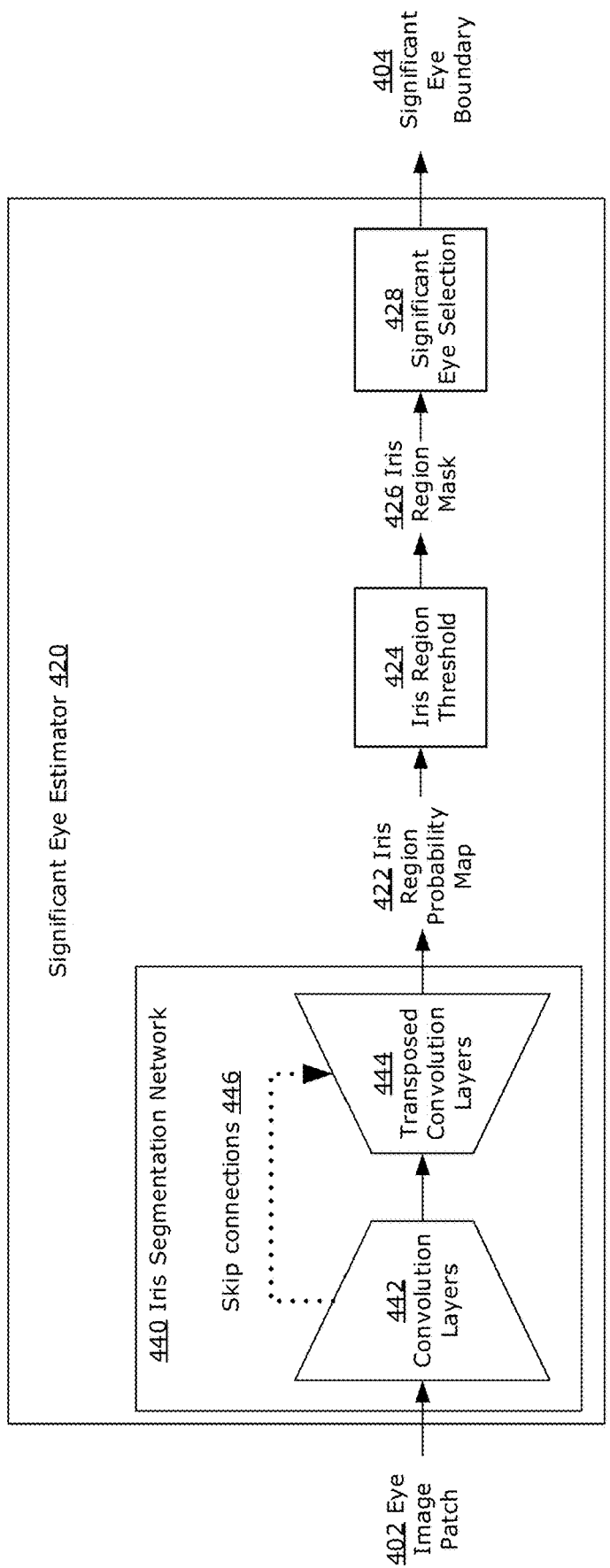
FIG. 4B is a block diagram illustrating an example architecture of the significant eye estimator, in accordance with examples of the present disclosure.
Figure 4C:
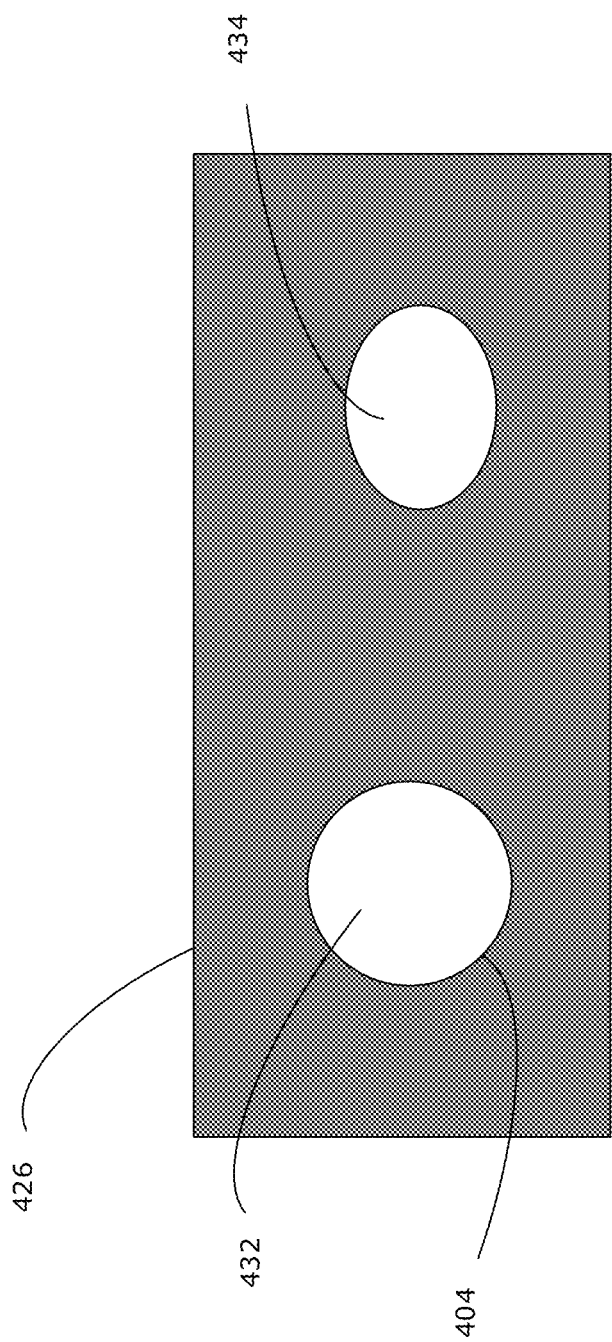
FIG. 4C is an example iris region mask that may be generated during execution of an example significant eye estimator, in accordance with examples of the present disclosure.

FIG. 4A is a block diagram illustrating the functional elements involved in generating a significant eye image patch 206 from a face image 202, in accordance with examples of the present disclosure. FIG. 4B is a block diagram illustrating an example architecture of the significant eye estimator 420, in accordance with examples of the present disclosure. FIG. 4C is an example iris region mask 426 obtained from an eye image patch 402 illustrating a largest iris region 432 (corresponding to the significant eye in the eye image patch 402) and a smaller iris region 434 (corresponding to the non-significant eye in the eye image patch 402).

Referring to FIG. 4A, a face landmark detector 410 may first be used to extract an eye image patch 402 from the face image 202. The face landmark detector 410 may be any suitable pre-trained machine-learning based face landmark detection algorithm, for example Google MediaPipe, or others. The face landmark detector 410 may identify 2D landmarks in the face image 202 and apply contours around landmarks such as the eyes, such that an eye image patch 402 can be cropped from the face image 202. For example, an eye image patch 402 may be an RGB image with dimensions 128×128×3 containing the two eyes present in the face image 202.

In some examples, the eye image patch 402 may then be input into a significant eye estimator 420 to identify the visually significant eye in the face image. For example, as discussed further below, the significant eye is determined to be the eye associated with the largest iris region 432 (i.e., the iris region that is largest in size, where the size of the different iris regions may be compared based on the total area occupied by each iris region, based on the major axis of the ellipse fitted to each iris region, or any other suitable measurement) in the iris region mask 426. The architecture of the significant eye estimator 420 is described below with reference to the example of FIG. 4B. It should be understood that the architecture of the significant eye estimator 420 may differ from that described herein (e.g., with fewer or greater numbers of neural network layers). In the following discussion, neural network layers (or blocks) of the significant eye estimator 420 will be referred to as layers for simplicity. The significant eye estimator 420 may include an iris segmentation network 440. The iris segmentation network 440 may be a convolutional neural network such as a U-Net style segmentation network. An example of a U-Net style segmentation network that can be implemented in example embodiments is described in: Ronneberger et al. "U-net: Convolutional networks for biomedical image segmentation," *International Conference on Medical image computing and computer-assisted intervention*, Springer, Cham, 2015. The iris segmentation network 440 may be fully convolutional, meaning it may consist of an equal number of standard convolution layers 442 and transposed convolution layers 444 and does not include any fully connected layers. For this reason, the iris segmentation network 440 may require less training data and is less computationally intensive and faster to implement than typical CNNs that do include fully connected layers. As an example, the iris segmentation network 440 may be considered an implementation of an encoder-decoder network in which skip connections 446 are used to link shallow layers with deeper layers. Skip connections 446 may enable faster training by skipping layers and directly feeding the output of one layer as the input of the next (non-subsequent) layer.

The design of the iris segmentation network 440 may be based on the U-Net style network, which is commonly used for semantic segmentation, or pixel-wise classification, where pixels of the same class are associated with the same label. In this way, the iris segmentation network 440 classifies pixels based on whether they are associated with one or more iris regions, and outputs an iris region probability map 422, where the iris region probability map represents the probability that each pixel is in an iris region. An iris region threshold 424 is applied to the iris region probability map 422 to generate an iris region mask 426 that represents the estimated iris regions. For example, a threshold value of 0.5 may be used to determine whether a pixel in the iris region probability map is in an iris region, where pixels associated with a probability level equal to or above 0.5 may be classified as being in an iris region. The pixels of the iris region probability map 422 can then be mapped to the pixels of the eye image patch 402 to generate an iris region mask 426. Referring to FIG. 4C, the iris region mask 426 may be a binary mask that corresponds to the pixels of the eye image patch 402 (e.g., the binary mask may have pixel values of 1s and 0s, where 1 indicates a corresponding pixel in the eye image patch 402 is classified as being in an iris region and 0 indicates background). The output after applying the iris region threshold 424 may have the same dimensions as the input eye image patch 402, for example 128×128 pixels.

In some examples, the significant eye estimator 420 may identify one or more iris regions of the eye image patch 402 and may determine which of the one or more identified iris regions represents the visually significant eye. Using a significant eye selection algorithm 428, the size of the one or more iris regions may be compared to identify the largest iris region 432 of the one or more iris regions. For example, the largest iris region 432 of the one or more iris regions may be determined by calculating a size (e.g., calculated based on area, major axis, diameter, etc.) of each iris region and selecting the iris region with the largest size as the largest iris region 432 corresponding to the significant eye. In some examples, using the significant eye selection algorithm 428, an ellipse may be fitted to each respective one of the boundaries of the one or more iris regions in the iris region mask 426, and the largest ellipse (i.e., the ellipse having the largest size, such as having the largest area, or the largest major axis) of the one or more fitted ellipses may be selected as the largest iris region 432 to represent the visually significant eye. In some examples, the ellipse associated with the largest iris region 432 (and that represents the visually significant eye) may form a significant eye boundary 404.

Returning to FIG. 4A, in some examples, the location of the significant eye boundary 404 may be mapped to a corresponding location in the face image 202. Through a process of significant eye extraction 430, a significant eye image patch 206 may be extracted from the face image 202 based on the significant eye boundary 404, such that a significant eye image patch 206 encompasses the visually significant eye. In some examples, the significant eye image patch 206 may have dimensions of 56×56×3.

Returning to FIG. 3, at step 308, one or more significant eye image feature maps 208 (i.e. feature representations) may be extracted from the significant eye image patch 206 using a trained significant eye feature extractor 230. The significant eye feature extractor 230 may be a CNN including multiple depth-wise convolution and pooling layers.

In some examples, at step 310 feature fusion is performed on the one or more face feature maps 206 (i.e. feature representations) and the one or more significant eye image feature maps 208 (i.e. feature representations) to generate fused features 210. Feature fusion may comprise multiplying the one or more face feature maps 206 (i.e. feature representations) and the one or more significant eye image feature maps 208 (i.e. feature representations) using element wise multiplication.

Finally, at step 312 an estimated gaze vector 212, representing a gaze direction may be outputted from the fused features 210 using a trained gaze estimator 240. The estimated gaze vector 212 may contain two angles describing the gaze direction, the angles being a yaw and a pitch.

In some examples, the estimated gaze direction may be output to an application on an electronic device (e.g., a software application executed by the computing system 100) to estimate the point on the screen that an individual is looking at. For example, if the application on the electronic device is an assistive tool to enable speech generation, obtaining accurate estimates of a point of gaze on a screen may enable a non-verbal individual to communicate by gazing at specific areas of the screen to spell words or assemble sentences. In another example, if the application on the electronic device is an educational application, gathering data on where and how long users look at certain areas of the screen can provide feedback to the provider of the educational application on the effectiveness of the educational content, what content holds the user's attention and what content is missed. Similarly, if the application on the electronic device contains advertising or marketing content, data can be gathered on the effectiveness of the content by examining if and for how long an individual looks at an advertisement. Data may be gathered to understand optimal placement of content on the screen or identify effective content that attracts an individual's attention more often and holds their attention for longer.

In other examples, the estimated gaze direction may output to an application to be executed by an in-vehicle computing system to assess the point of gaze of an individual operating the vehicle. In situations where the individual operating the vehicle appears to be distracted or inattentive, for example, looking away from the road frequently or for extended periods, the vehicle safety system may provide a notification or an alert to the operator of the vehicle to remind them to pay attention to the road ahead.

In some examples, the gaze estimation system 200, including the face feature extractor 220, the significant eye feature extractor 230 and the gaze estimator 240 may all be trained as one network using supervised learning with a labeled training dataset. The labeled training dataset may consist of a batch of labeled face images, where each labeled face image is labeled with a ground-truth direction vector or gaze point. The network may then be trained to minimize error (e.g., minimize a loss function) between the labeled and predicted gaze vector using a backpropagation approach to obtain a final set of weights for the network. In some examples, the size (n) of the batch of labeled face images used to train the network may be 64. During training of the gaze estimation system 200 with a batch of n labeled face images, the dimensions of the face feature maps 204, the significant eye image feature maps 208 and the fused features 210 may be n×14×14×8. Similarly, the dimensions of the various layers of the gaze estimator 240 may include a dimension of n to account for the batch of labeled face images. For example, the output layer may exhibit dimensions n×1×1×2.

Prior to training the gaze estimation system, the iris segmentation network 440 within the significant eye estimator 420 may also be pre-trained by supervised learning using a labeled training dataset. The training dataset may be created by manually annotating images of the same size as the input (e.g. 128×128 pixels) by selecting at least ten points along an iris-sclera boundary in the image, and fitting an ellipse to the selected points to form a boundary (e.g., using the OpenCV function fit ellipse). Further, all pixels located within the ellipse boundary may be labelled with a value of 1 while pixels outside the ellipse boundary may be labelled with a value of 0, thereby generating a binary mask as the ground-truth label of each annotated image.

Figure 5:
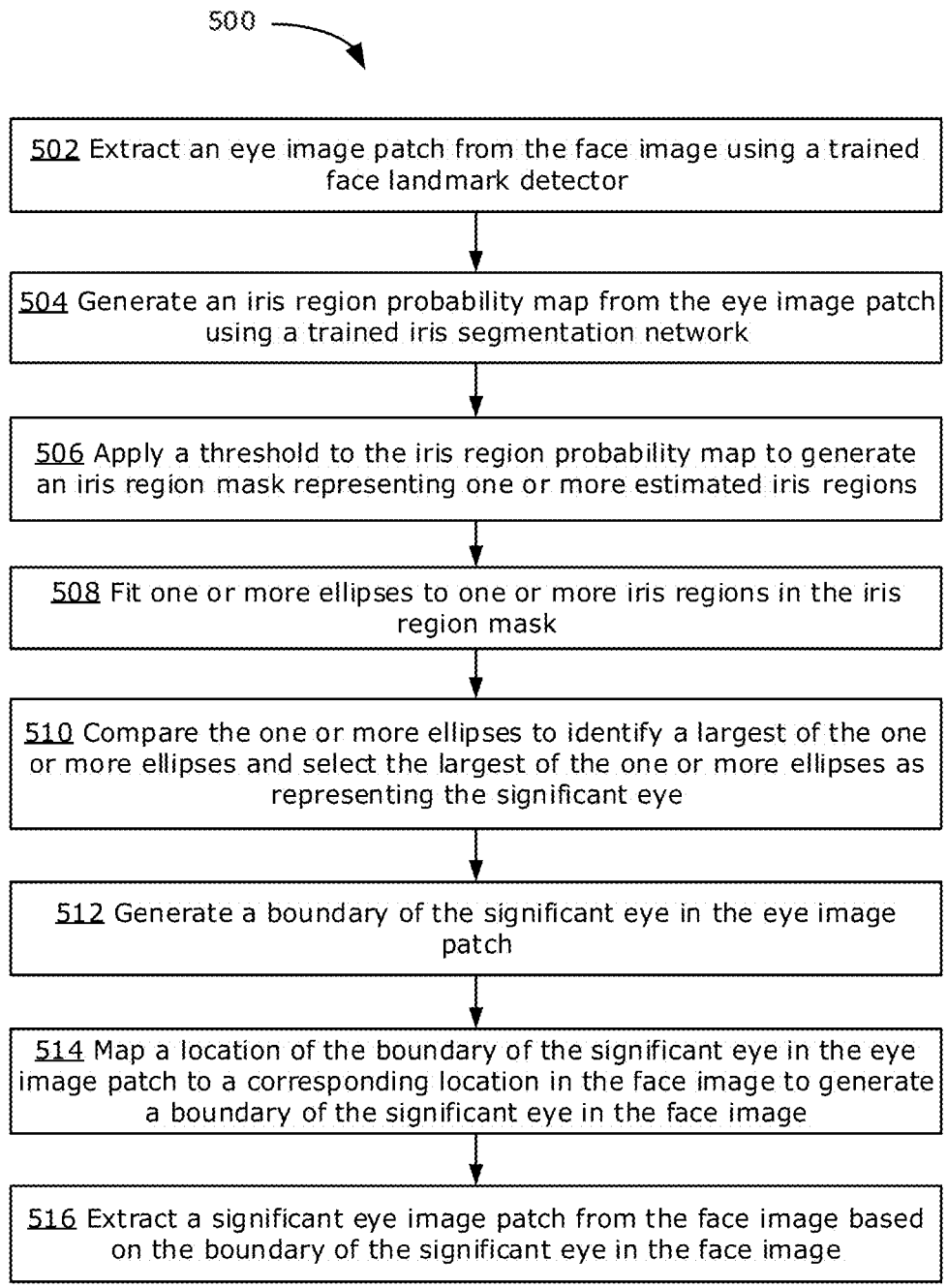
FIG. 5 is a flowchart illustrating an example method for extracting a significant eye image patch from the face image, in accordance with examples of the present disclosure.

FIG. 5 is a flowchart illustrating an example method 500 for extracting a significant eye image patch 206 from the face image 202, in accordance with examples of the present disclosure. The method 500 may be performed by the computing system 100. For example, the processor 102 may execute computer readable instructions (which may be stored in the memory 112) to cause the computing system 100 to perform the method 500. The method 500 may be performed using a single physical machine (e.g., a workstation or server), a plurality of physical machines working together (e.g., a server cluster), or cloud-based resources (e.g., using virtual resources on a cloud computing platform).

Method 500 begins with step 502 in which an eye image patch 402 may be obtained from the face image 202 using a trained face landmark detector 410. The face landmark detector 410 may identify 2D landmarks in the face image 202 including the eyes, such that an eye image patch 402 containing images of one or more eyes can be cropped from the face image 202.

In some examples, at step 504, an iris region probability map 422 may be generated from the eye image patch 402 using the trained iris segmentation network 440. The iris segmentation network 440 may classify pixels based on whether they are associated with one or more iris regions. An iris region probability map 422 may therefore be generated, where the iris region probability map 422 represents the probability that each pixel is in an iris region.

In some examples, at step 506, an iris region threshold 424 is applied to the iris region probability map 422 to generate an iris region mask 426 that represents the estimated iris regions. The iris region mask 426 may be a binary mask of 1s and 0s, where 1 indicates a pixel is classified as being in an iris region 404 and 0 indicates background.

In some examples, it may be necessary to identify which of the one or more identified iris regions represents the visually significant eye. At step 508, one or more ellipses may be fit to the boundaries of the one or more iris regions in the iris region probability mask 426. The size of the fitted one or more ellipses are then compared such that at step 510, the visually significant eye may be selected as the iris region associated with the largest of the fitted one or more ellipses. In some examples, the size of the fitted one or more ellipses may be compared based on the total area of each ellipse, based on the major axis of each ellipse, or by some other suitable measurement. In some examples, the ellipse associated with the visually significant eye may form a significant eye boundary 404.

In some examples, at step 512, a boundary of the significant eye 404 may be generated in the eye image patch 402 using the ellipse associated with the visually significant eye.

In some examples, at step 514 the location of the significant eye boundary 404 in the eye image patch 402 may then be mapped to a corresponding location in the face image 202. At step 516, a significant eye image patch 206 may then be extracted from the face image 202 based on the mapped significant eye boundary 404 in the face image 202, such that the significant eye image patch 206 incorporates visual information for the visually significant eye.

The present disclosure has described examples in the context of gaze tracking of video images captured on an RGB camera. It should be understood that the present disclosure may be applicable to gaze estimation of both static images (e.g., digital photographs) and video images captured on other types of cameras.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method for estimating a gaze vector representing a gaze direction, the method comprising:
    obtaining a face image;
    extracting one or more face feature maps from the face image;
    obtaining a significant eye image patch extracted from the face image, the significant eye image patch containing a visible eye region representing one significant eye that contains more visual information compared to any other visible eye region representing any other eye in the face image;
    extracting one or more significant eye image feature maps from the significant eye image patch;
    performing feature fusion on the one or more face feature maps and the one or more significant eye image feature maps to generate fused features; and
    outputting an estimated gaze vector from the fused features.

2. The method of claim 1, wherein obtaining the significant eye image patch comprises:
    extracting an eye image patch from the face image;
    identifying one or more iris regions in the eye image patch, each iris region corresponding to a respective eye in the eye image patch;
    comparing a size of the one or more iris regions to identify a largest iris region of the one or more iris regions, the largest iris region corresponding to the one significant eye and any other smaller iris region corresponding to a respective other non-significant eye;
    selecting the one significant eye for the eye image patch; and
    extracting the significant eye image patch containing the one significant eye from the face image.

3. The method of claim 2, wherein identifying one or more iris regions in the eye image patch comprises:

generating an iris region probability map from the eye image patch, the iris region probability map representing a probability of each of a plurality of pixels in the eye image patch being associated with the one or more iris regions;

applying a threshold to the iris region probability map to generate an iris region mask representing one or more estimated iris regions; and fitting one or more ellipses to the iris region mask, the one or more ellipses form respective one or more boundaries of the respective one or more iris regions.

4. The method of claim 3, wherein selecting the one significant eye for the eye image patch comprises:

comparing a size of the fitted one or more ellipses to the iris region mask to identify a largest ellipse of the one or more ellipses, the largest ellipse of the one or more ellipses representing the one significant eye; and generating a boundary of the one significant eye in the eye image patch.

5. The method of claim 4, wherein extracting the significant eye image patch from the face image comprises:

mapping a location of the boundary of the one significant eye in the eye image patch to a corresponding location in the face image to generate a boundary of the one significant eye in the face image; and extracting the significant eye image patch from the face image based on the boundary of the one significant eye in the face image.

6. The method of claim 1, wherein performing feature fusion on the one or more face feature maps and the one or more significant eye image feature maps comprises:

multiplying the one or more face feature maps and the one or more significant eye image feature maps using element wise multiplication.

7. The method of claim 1, wherein outputting the gaze vector comprises extracting depth-related information across one or more channels from the fused features.

8. The method of claim 7, wherein extracting depth-related information from the fused features uses depth-wise convolution layers.

9. The method of claim 1, wherein the face image is an RGB image without depth data.

10. The method of claim 1, wherein the method is performed on a mobile device.

11. An electronic device for estimating a gaze vector representing a gaze direction, the device comprising a processing unit configured to execute instructions to cause the device to:

obtain a face image;

extract one or more face feature maps from the face image;

obtain a significant eye image patch containing a significant eye extracted from the face image, the significant eye image patch containing a visible eye region representing one significant eye that contains more visual information compared to any other visible eye region representing any other eye in the face image;

extract one or more significant eye image feature maps from the significant eye image patch;

perform feature fusion on the one or more face feature maps and the one or more significant eye image feature maps to generate fused features; and output an estimated gaze vector from the fused features.

12. The device of claim 11, wherein in obtaining the significant eye image patch, the processing unit is further configured to execute the instructions to cause the device to:

extract an eye image patch from the face image;

identify one or more iris regions in the eye image patch, each iris region corresponding to a respective eye in the eye image patch;

compare a size of the one or more iris regions to identify a largest iris region of the one or more iris regions, the largest iris region corresponding to the one significant eye and any other smaller iris region corresponding to a respective other non-significant eye;

select the one significant eye for the eye image patch; and extract the significant eye image patch containing the one significant eye from the face image.

13. The device of claim 12, wherein in identifying one or more iris regions in the eye image patch, the processing unit is further configured to execute the instructions to cause the device to:

generate an iris region probability map from the eye image patch, the iris region probability map representing a probability of each of a plurality of pixels in the eye image patch being associated with the one or more iris regions;

apply a threshold to the iris region probability map to generate an iris region mask representing one or more estimated iris regions; and fit one or more ellipses to the iris region mask, the one or more ellipses form respective one or more boundaries of the respective one or more iris regions.

14. The device of claim 13, wherein in selecting the one significant eye for the eye image patch, the processing unit is further configured to execute the instructions to cause the device to:

compare a size of the one or more fitted ellipses to the iris region mask to identify a largest ellipse of the one or more ellipses, the largest ellipse of the one or more ellipses representing the one significant eye; and generate a boundary of the one significant eye in the eye image patch.

15. The device of claim 14, wherein in extracting the significant eye image patch from the face image, the processing unit is further configured to execute the instructions to cause the device to:

map a location of the boundary of the one significant eye in the eye image patch to a corresponding location in the face image to generate a boundary of the one significant eye in the face image; and extract the significant eye image patch from the face image based on the boundary of the one significant eye in the face image.

16. The device of claim 11, wherein in performing feature fusion on the one or more face feature maps and the one or more significant eye image feature maps, the processing unit is further configured to execute the instructions to cause the device to:

multiply the one or more face feature maps and the one or more significant eye image feature maps using element wise multiplication.

17. The device of claim 11, wherein the processing unit is further configured to execute the instructions to cause the device to extract depth-related information across one or more channels from the fused features.

18. The device of claim 11, wherein the face image is an RGB image without depth data.

19. The device of claim 11, wherein the device is a mobile device.

20. A non-transitory computer-readable medium having machine-executable instructions stored thereon which, when executed by a processor of a device, cause the device to:

obtain a face image;

extract one or more face feature maps from the face image;
obtain a significant eye image patch containing a significant eye extracted from the face image, the significant eye image patch containing a visible eye region representing one significant eye that contains more visual information compared to any other visible eye region representing any other eye in the face image;
extract one or more significant eye image feature maps from the significant eye image patch;
perform feature fusion on the one or more face feature maps and the one or more significant eye image feature maps to generate fused features; and
output an estimated gaze vector from the fused features.

* * * * *

UNITED STATES PATENT AND TRADEMARK OFFICE
CERTIFICATE OF CORRECTION

PATENT NO. : 12,175,014 B2
APPLICATION NO. : 17/536683
DATED : December 24, 2024
INVENTOR(S) : Soumil Chugh and Juntao Ye Page 1 of 1

It is certified that error appears in the above-identified patent and that said Letters Patent is hereby corrected as shown below:

In the Claims

In Column 19, Lines 52 and 53 (Claim 11): "obtain a significant eye image patch containing a significant eye extracted from the face image, the significant" should read --obtain a significant eye image patch extracted from the face image, the significant--.

In Column 21, Lines 3 and 4 (Claim 20): "obtain a significant eye image patch containing a significant eye extracted from the face image, the significant" should read --obtain a significant eye image patch extracted from the face image, the significant--.

Signed and Sealed this
Eleventh Day of February, 2025

Coke Morgan Stewart
*Acting Director of the United States Patent and Trademark Office*